United States Patent
Mason et al.

(10) Patent No.: US 10,766,385 B2
(45) Date of Patent: Sep. 8, 2020

(54) CHILD SAFETY SEAT

(71) Applicant: Wonderland Switzerland AG, Steinhausen (CH)

(72) Inventors: Kyle S. Mason, Lititz, PA (US); David A. Lehman, Lancaster, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 55 days.

(21) Appl. No.: 16/113,741

(22) Filed: Aug. 27, 2018

(65) Prior Publication Data

US 2019/0061571 A1    Feb. 28, 2019

Related U.S. Application Data

(60) Provisional application No. 62/550,838, filed on Aug. 28, 2017.

(51) Int. Cl.
*B60N 2/28* (2006.01)
*A47D 1/00* (2006.01)
*A47D 1/10* (2006.01)

(52) U.S. Cl.
CPC .......... *B60N 2/2812* (2013.01); *A47D 1/002* (2013.01); *B60N 2/2851* (2013.01); *B60N 2/2863* (2013.01); *B60N 2/2872* (2013.01); *B60N 2002/2815* (2013.01); *B60N 2002/2818* (2013.01)

(58) Field of Classification Search
CPC .. B60N 2/2812; B60N 2/2851; B60N 2/2863; B60N 2/2872; A47D 1/002
USPC .................................. 297/253, 254, 256.14
See application file for complete search history.

(56) References Cited

U.S. PATENT DOCUMENTS

| | | | |
|---|---|---|---|
| 4,480,870 A * | 11/1984 | von Wimmersperg | ...................... B60N 2/2809 297/256.14 X |
| 8,136,881 B2 * | 3/2012 | Vertegaal | ............. B60N 2/2824 297/253 X |
| 8,366,192 B2 * | 2/2013 | Clement | .............. B60N 2/2821 297/253 X |

(Continued)

FOREIGN PATENT DOCUMENTS

| | | |
|---|---|---|
| CN | 203580701 U | 5/2014 |
| CN | 105539221 A | 5/2016 |

(Continued)

OTHER PUBLICATIONS

Combined Search and Examination Report issued by the Intellectual Property Office dated Mar. 14, 2019 in connection with UK Patent Application No. 1813966.7.

*Primary Examiner* — Rodney B White
(74) *Attorney, Agent, or Firm* — NZ Carr Law Office

(57) ABSTRACT

A child safety seat includes a seat shell having a seat region for receiving a child, two extension parts and a locking mechanism. The two extension parts are respectively disposed at a left and a right side of the seat region, are connected with the seat shell, and are coupled to each other via a linking assembly. The two extension parts are movable together relative to the seat shell to protrude forward from a front of the seat shell or retract toward the seat shell, the two extension parts being disconnected from each other at the front of the seat shell. The locking mechanism is operable to lock the two extension parts in position relative to the seat shell.

18 Claims, 13 Drawing Sheets

(56) References Cited

U.S. PATENT DOCUMENTS

| | | | |
|---|---|---|---|
| 8,708,415 B2* | 4/2014 | Gabriel | B60N 2/286 |
| | | | 297/397 |
| 8,926,014 B2* | 1/2015 | Su | B60N 2/286 |
| | | | 297/253 X |
| 2010/0033001 A1 | 2/2010 | Boyer | |
| 2012/0200131 A1 | 8/2012 | Mason et al. | |

FOREIGN PATENT DOCUMENTS

| | | | | |
|---|---|---|---|---|
| CN | 105946638 A | | 9/2016 | |
| CN | 205674902 U | | 11/2016 | |
| DE | 19545265 A1 | | 5/1997 | |
| DE | 19915543 A1 | | 10/2000 | |
| EP | 1839935 A1 | | 10/2007 | |
| EP | 2428394 A1 | * | 3/2012 | ........... B60N 2/2863 |
| EP | 2746097 A1 | * | 6/2014 | ........... B60N 2/2872 |
| GB | 2360938 A | * | 10/2001 | ........... B60N 2/2863 |
| GB | 2470215 A | | 11/2010 | |

\* cited by examiner

CHILD SAFETY SEAT

CROSS-REFERENCE TO RELATED APPLICATION(S)

This application claims priority to U.S. Provisional Patent Application No. 62/550,838 filed on Aug. 28, 2017, the disclosure of which is incorporated by reference.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., the back supporting the head). Accordingly, safety experts and car seat manufacturers have changed the recommendations to seat children in a vehicle in a rear facing position until the age of 2 years old. However, the child safety seats currently available on the market are usually dimensioned to receive younger children having a small body. These child safety seats when installed in the rear facing position do not leave enough room to receive older children having longer legs.

In order to remedy the aforementioned disadvantage, some existing approach propose a child safety seat having an extendible element that may be deployed at the front of the child safety seat to create a greater space between the seatback of a vehicle seat and the front of the child safety seat in the rear facing position. However, the existing extendible element may require a child to sit with the legs generally extended, which may not provide a comfortable sitting environment.

Therefore, there is a need for an improved child safety seat that can accommodate children of different ages, and can address at least the foregoing issues.

SUMMARY

The present application describes a child safety seat that can be adjustable to accommodate children of different ages in a rear facing configuration. In one embodiment, the child safety seat includes a seat shell having a seat region for receiving a child, two extension parts and a locking mechanism. The two extension parts are respectively disposed at a left and a right side of the seat region, are connected with the seat shell, and are coupled to each other via a linking assembly. The two extension parts are movable together relative to the seat shell to protrude forward from a front of the seat shell or retract toward the seat shell, the two extension parts being disconnected from each other at the front of the seat shell. The locking mechanism is operable to lock the two extension parts in position relative to the seat shell.

DETAILED DESCRIPTION OF THE EMBODIMENTS

Figure 1:
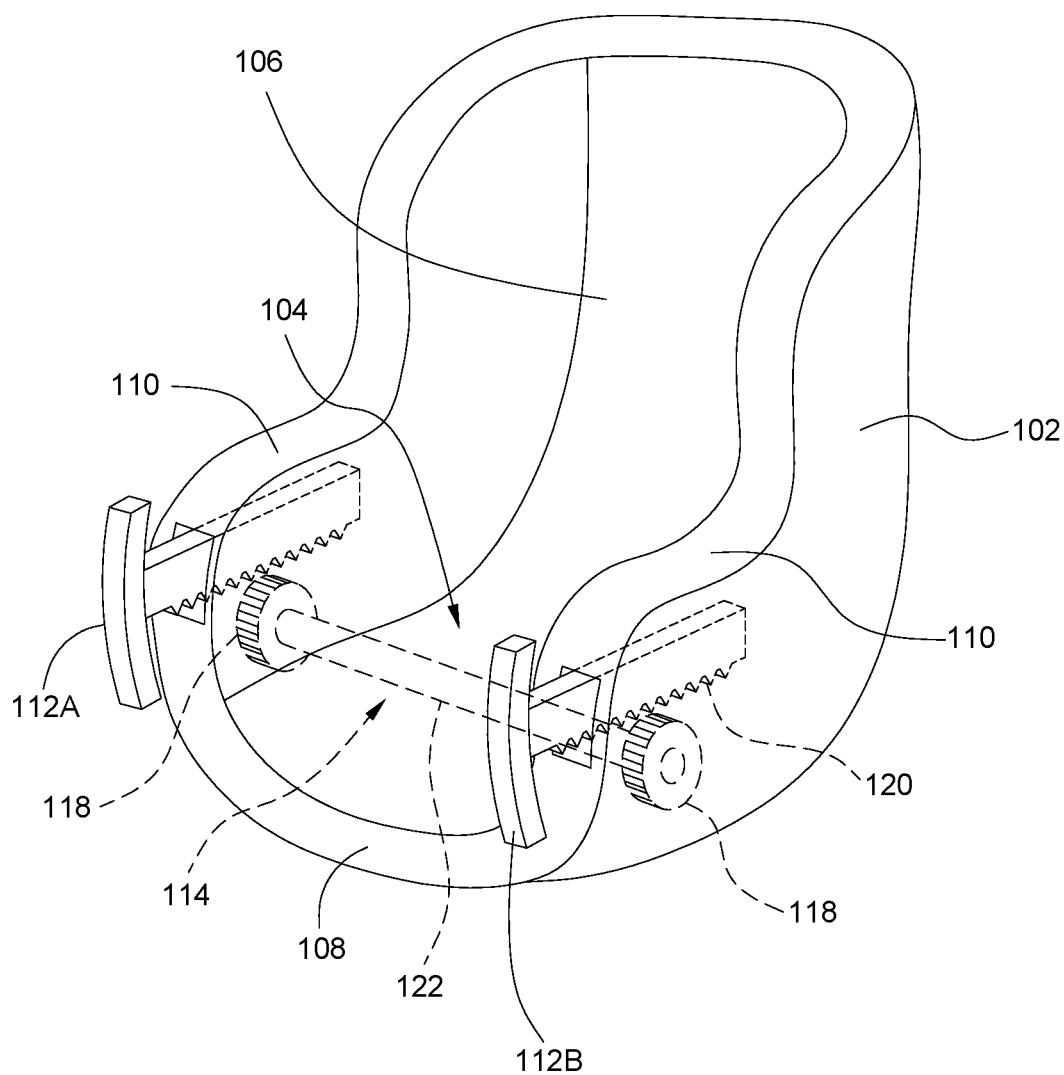
FIG. 1 is a simplified perspective view illustrating an embodiment of a child safety seat.
Figure 2:
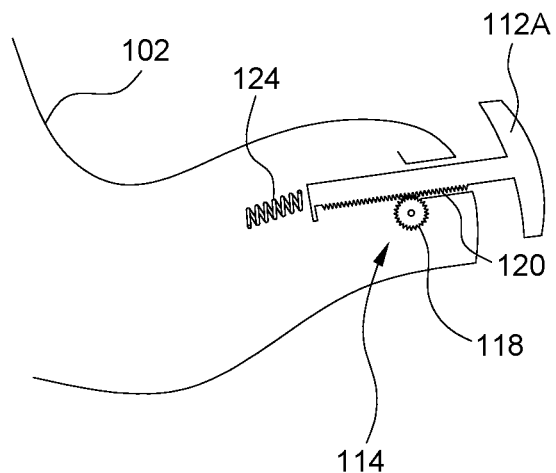
FIG. 2 is a left side view schematically illustrating some construction details of the child safety seat shown in FIG. 1.
Figure 3:
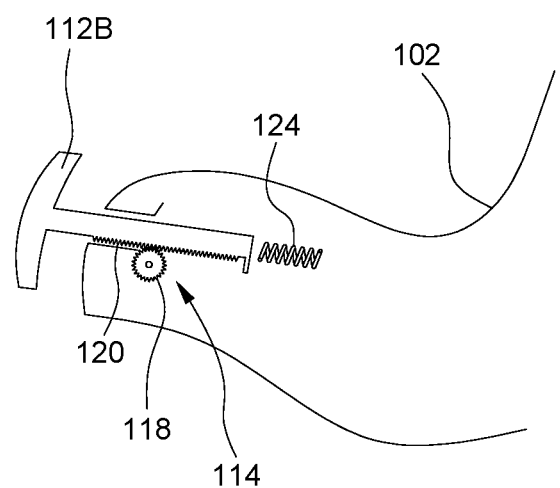
FIG. 3 is a right side view schematically illustrating some construction details of the child safety seat shown in FIG. 1.

FIG. 1 is a simplified perspective view illustrating an embodiment of a child safety seat 100 suitable for seating a child in a vehicle, and FIGS. 2 and 3 are respectively a left and a right side view schematically illustrating some construction details of the child safety seat 100. Referring to FIGS. 1-3, the child safety seat 100 can include a seat shell 102 having a seat region 104 for receiving a child. The seat region 104 can extend from a backrest 106 to a front 108 of the seat shell 102, and can be sideways delimited at least partially by two sidewalls 110. The seat shell 102, including the backrest 108 and the sidewalls 110, may be formed by plastic molding.

The child safety seat 100 can further include two extension parts 112A and 112B respectively disposed at a left and a right side of the seat region 104 and connected with the seat shell 102. The two extension parts 112A and 112B may be assembled with the seat shell 102 for back and forth sliding movement, and can be slidably coupled to each other via a linking assembly 114. The two extension parts 112A and 112B are disconnected from each other at the front 108 of the seat shell 102, and the linking assembly 114 is disposed in an interior of the seat shell 102 below the seat region 104. The two extension parts 112A and 112B are thereby slidably coupled to each other, and can move together relative to the seat shell 102 to protrude forward from the front 108 of the seat shell 102 or retract toward the seat shell 102. When the child safety seat 100 is installed on a vehicle seat in a rear facing position, the two extension parts 112A and 112B are positioned adjacent to a seatback of the vehicle seat, and may be movably adjusted relative to the seat shell 102 as desired. In particular, the two extension parts 112A and 112B may be extended from the front 108 of the seat shell 102 so that a greater space may be left between the seatback of the vehicle seat and the front 108 of the seat shell 102 for placement of the child's legs. Because the two extension parts 112A and 112B are transversally disconnected and separated from each other at the front 108 of the seat shell 102, a child can sit on the seat region 104 with the legs folded and placed in a clearance between the two extension parts 112A and 112B and in front of the seat shell 102.

Referring to FIGS. 1-3, the linking assembly 114 can include two gears 118 rotationally coupled to each other that are pivotally connected with the seat shell 102, and the two extension parts 112A and 112B can respectively have two toothed portions 120 inside the seat shell 102, the two gears 118 respectively meshing with the two toothed portions 120 of the two extension parts 112A and 112B. According to an example of construction, the two gears 118 can be rotationally coupled to each other by providing a transversal shaft 122 that is fixedly connected with the two gears 118. The two gears 118 and the transversal shaft 122 can rotate in unison relative to the seat shell 102 as the two extension parts 112A and 112B slide relative to the seat shell 102. Through the linking assembly 114, the two extension parts 112A and 112B can slide in unison relative to the seat shell 102.

According to an example of construction, a spring action may be applied to the two extension parts 112A and 112B to facilitate a sliding movement of the two extension parts 112A and 112B in operation. For example, the two extension parts 112A and 112B may be respectively connected with two springs 124, which respectively bias the two extension parts 112A and 112B for protruding forward from the seat shell 102.

In conjunction with FIGS. 1-3, FIG. 4 is a schematic perspective view illustrating a locking mechanism 126 operable to lock the two extension parts 112A and 112B in position relative to the seat shell 102. Referring to FIGS. 1-4, the locking mechanism 126 can include one or more latch 128 connected with the seat shell 102, which is movable to engage with the linking assembly 114 to rotationally lock the two gears 118 and thereby prevent sliding movement of the two extension parts 112A and 112B relative to the seat shell 102, and disengage from the linking assembly 114 to allow rotation of the two gears 118 for sliding movement of the two extension parts 112A and 112B relative to the seat shell 102. According to an example of construction, two latches 128 are provided, which can respectively have toothed portions and can be connected with the seat shell 102 for sliding movement to engage with and disengage from the two gears 118. For example, the two latches 128 can be fixedly connected with a linking shaft 130 that can be slidably assembled with the seat shell 102, whereby the two latches 128 and the linking shaft 130 can slide in unison along a transversal axis 132 extending from a left to a right side of the seat shell 102. The two latches 128 can thereby slide in unison along the transversal axis 132 to respectively engage with or disengage from the two gears 118. FIG. 5 is a schematic view illustrating the two latches 128 engaged with the two gears 118, which locks the two extension parts 112A and 112B in position relative to the seat shell 102. FIG. 6 is a schematic view illustrating the two latches 128 disengaged from the two gears 118 for movement of the two extension parts 112A and 112B relative to the seat shell 102.

According to an example of construction, a spring action may be applied to facilitate the sliding movement of the two latches 128 toward a locking state. For example, the linking shaft 130 may be connected with a spring (not shown), which can bias the linking shaft 130 and the two latches 128 toward the locking state for engagement of the two latches 128 with the two gears 118.

Figure 4:
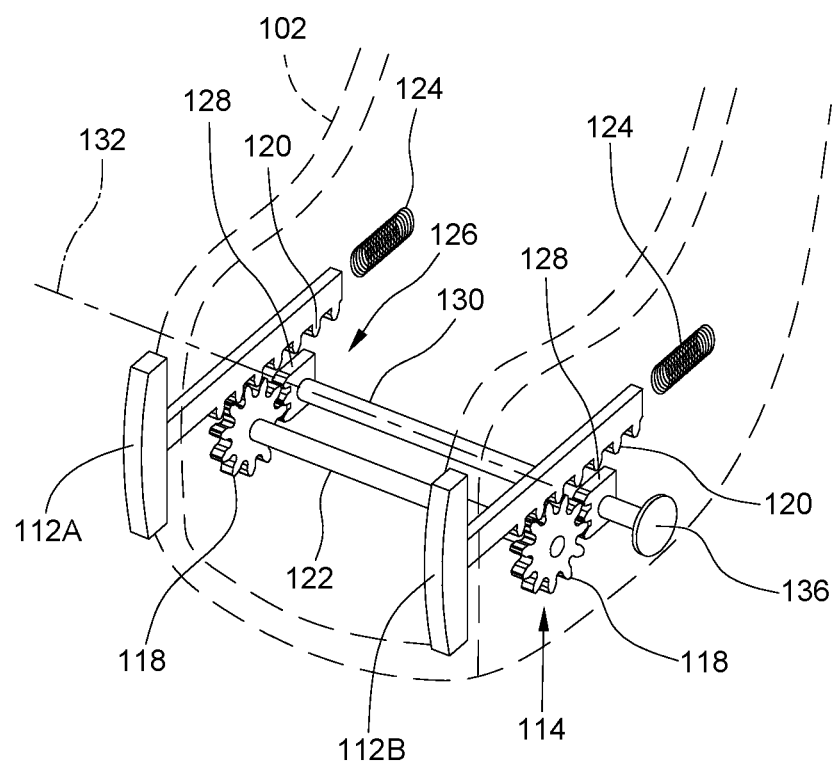
FIG. 4 is a schematic perspective view illustrating a locking mechanism operable to lock two extension parts of the child safety seat shown in FIG. 1.
Figure 5:
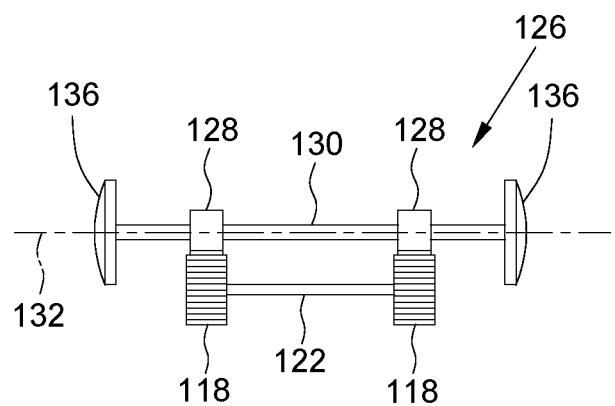
FIG. 5 is a schematic view illustrating two latches of the locking mechanism shown in FIG. 4 engaged with two gears for locking the two extension parts of the child safety seat.
Figure 6:
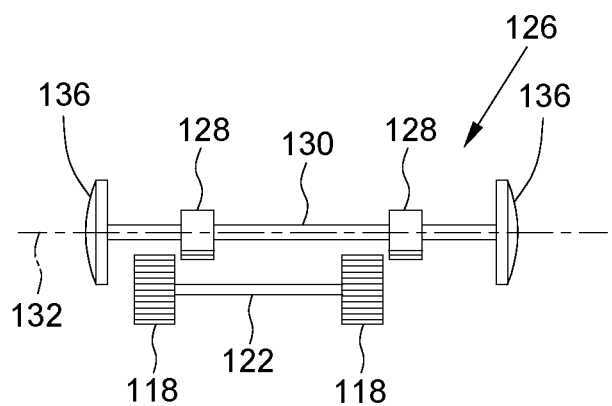
FIG. 6 is a schematic view illustrating the two latches of the locking mechanism shown in FIG. 4 disengaged from the two gears for movement of the two extension parts.
Figure 7:
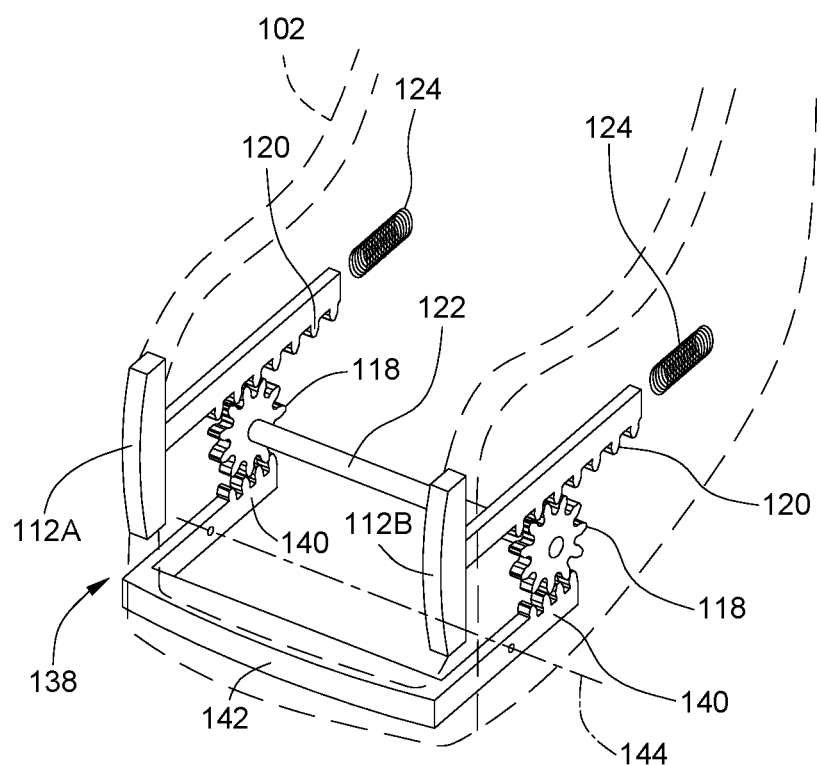
FIG. 7 is a schematic perspective view illustrating another construction of a locking mechanism for locking the two extension parts of the child safety seat shown in FIG. 1.
Figure 8:
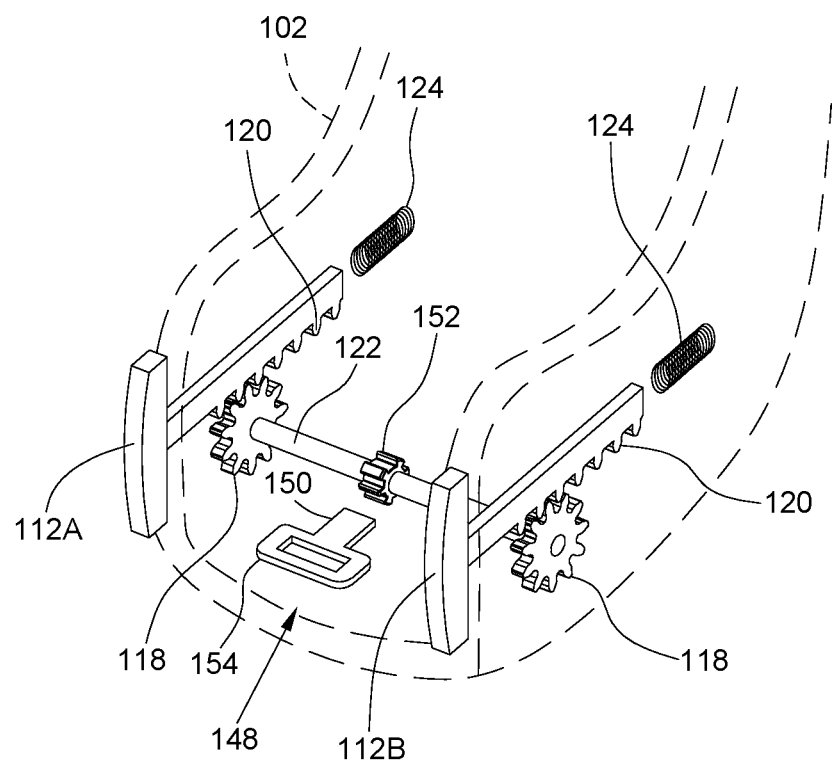
FIG. 8 is a schematic perspective view illustrating another construction of a locking mechanism for locking the two extension parts of the child safety seat shown in FIG. 1.
Figure 9:
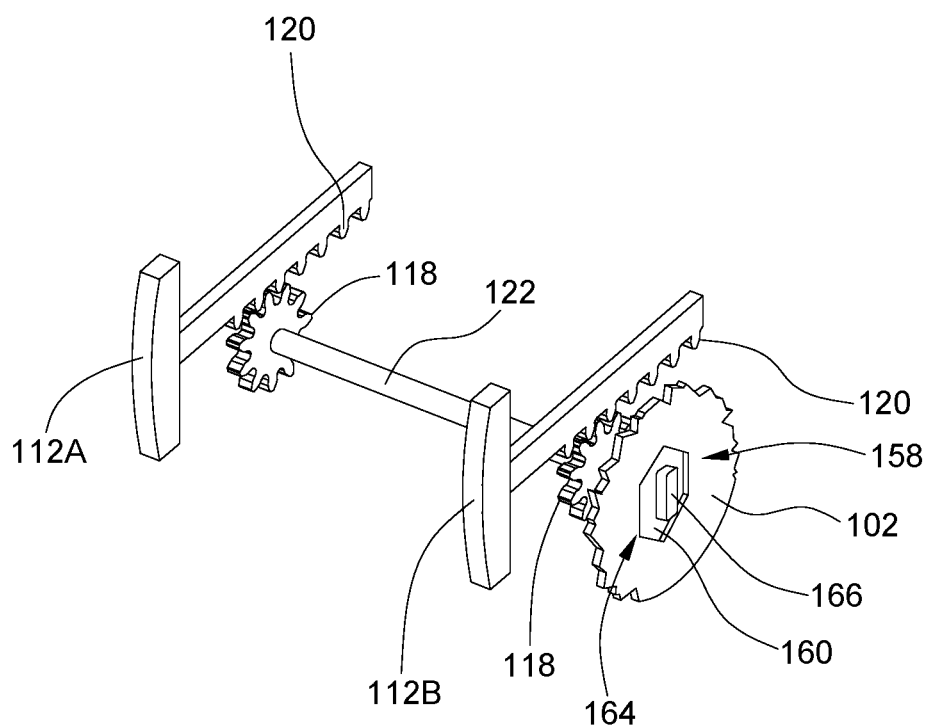
FIG. 9 is a schematic perspective view illustrating another construction of a locking mechanism for locking the two extension parts of the child safety seat shown in FIG. 1.

Referring to FIGS. 4-6, the two latches 128 can be connected with two actuation parts 136 respectively accessible from two opposite sides (e.g., left and right sides) of the seat shell 102 for operation. For example, the two actuation parts 136 can be fixedly connected with the two latches 128 and/or the linking shaft 130. With this construction, the two latches 128, the linking shaft 130 and the two actuation parts 136 can transversally slide in unison to the left or right side relative to the seat shell 102. Each of the two actuation parts 136 is thereby operable to cause the two latches 128 to slide in unison along the transversal axis 132 for disengaging from the two gears 118.

Although the embodiment described herein uses two latches 128, it will be appreciated that the locking mechanism 126 may have one single latch 128 operable in a similar way to lock the two extension parts 112A and 112B. Moreover, there is no limitation on the number of actuation parts. For example, some embodiment may provide one single actuation part 136 on one side of the seat shell 102 for unlocking the two extension parts 112A and 112B.

In conjunction with FIGS. 1-3, FIG. 7 is a schematic perspective view illustrating another locking mechanism 138 that may substitute for the locking mechanism 126 described previously to lock the two extension parts 112A and 112B in position. The locking mechanism 138 can include two latches 140 and an actuation part 142. The two latches 140 can respectively have toothed portions adapted to engage with the two gears 118, and can be pivotally connected with the seat shell 102 about a same pivot axis 144 that extends transversally. The actuation part 142 can be fixedly connected with the two latches 140 at two opposite sides, and can be exposed and accessible from the front of the seat shell 102 for operation. According to an example of construction, the two latches 140 and the actuation part 142 can be formed integrally as a single part. According to another example of construction, the actuation part 142 may be a separate part fastened to the two latches 140. In the locking mechanism 138, the two latches 140 and the actuation part 142 can rotate in unison about the pivot axis 144. In particular, the two latches 140 can rotate in unison to engage with the two gears 118 for locking the two extension parts 112A and 112B in position, and can rotate in unison to disengage from the two gears 118 for unlocking the two extension parts 112A and 112B. Moreover, the actuation part 142 is operable by a caregiver to urge the two latches 140 in rotation for disengaging from the two gears 118 and thereby unlocking the two extension parts 112A and 112B.

In conjunction with FIGS. 1-3, FIG. 8 is a schematic perspective view illustrating another locking mechanism 148 that may substitute for the locking mechanisms described previously to lock the two extension parts 112A and 112B in position. Referring to FIGS. 1-3 and 8, the locking mechanism 148 can include a latch 150 movable to engage with and disengage from the transversal shaft 122. For example, the transversal shaft 122 can have a toothed portion 152 that is disposed between the two gears 118 and is fixedly connected with the transversal shaft 122. The latch 150 can be connected with the seat shell 102 for back and forth sliding movement, and can be connected with an actuation part 154 exposed at the front of the seat shell 102 for operation. According to an example of construction, the latch 150 can be fixedly connected with the actuation part 154, e.g., the latch 150 and the actuation part 154 can be formed integrally as a single part. The latch 150 can slide rearward to engage with the toothed portion 152 and thereby rotationally lock the transversal shaft 122 and the two gears 118, which can lock the two extension parts 112A and 112B in position. For adjusting the two extension parts 112A and 112B, the actuation part 154 may be pulled to urge the latch 150 to slide forward. As a result, the latch 150 can disengage from the toothed portion 152, which can rotationally unlock the transversal shaft 122 and the two gears 118 for movement of two extension parts 112A and 112B relative to the seat shell 102.

In conjunction with FIGS. 1-3, FIGS. 9-11 are schematic views illustrating another locking mechanism 158 that may substitute for the locking mechanisms described previously to lock the two extension parts 112A and 112B in position. Referring to FIGS. 1-3 and 9-11, the locking mechanism 158 can include a latch 160 and a spring 162. The latch 160 can be connected with the transversal shaft 122 so that both the latch 160 and the transversal shaft 122 are rotationally coupled to each other, but the latch 160 can slide axially relative to the transversal shaft 122.

Figure 11:
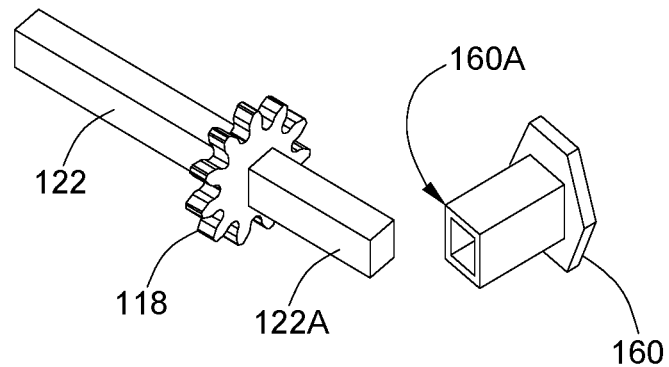
FIG. 11 is a perspective view illustrating some construction details for connecting a transversal shaft with a latch of the locking mechanism shown in FIG. 9.
Figure 12:
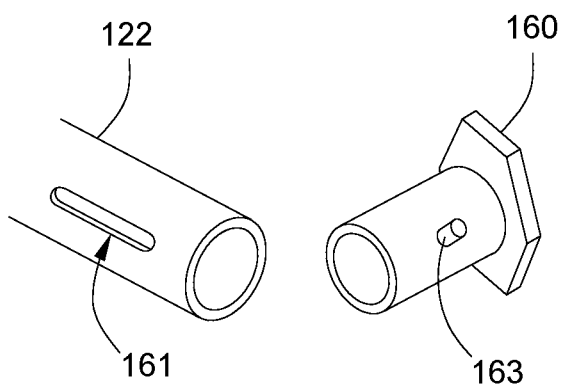
FIG. 12 is a perspective view illustrating some construction details for connecting a transversal shaft with a latch of the locking mechanism shown in FIG. 9 according to another example of construction.

According to an example of construction illustrated in FIG. 11, an end 122A of the transversal shaft 122 can have a polygonal cross-section, which can be received in an opening 160A of the latch 160 that has a cross-sectional shape complementarily matching with the end 122A of the transversal shaft 122. In this manner, the latch 160 is rotationally coupled to the transversal shaft 122, but can slide axially relative to the transversal shaft 122. It will be appreciated, however, that other constructions may be applied to rotationally couple the latch 160 and the transversal shaft 122 while allowing axial sliding of the latch 160 relative to the transversal shaft 122. For example, a variant construction illustrated in FIG. 12 can provide an elongate slot 161 in the transversal shaft 122, and the latch 160 can have a pin 163 slidably received in the elongate slot 161 of the transversal shaft 122.

Referring again to FIGS. 1-3 and 9-11, the latch 160 can slide relative to the transversal shaft 122 between a locking position where the latch 160 is engaged with the seat shell 102, and an unlocking position where the latch 160 is disengaged from the seat shell 102. For example, the latch 160 can be engaged with an opening 164 of the seat shell 102 in the locking position and disengaged from the opening 164 of the seat shell 102 in the unlocking position. The engagement of the latch 160 with the opening 164 can rotationally lock the latch 160, the transversal shaft 122 and the two gears 118 to the seat shell 102, which can lock and prevent sliding movement of the extension parts 112A and 112B relative to the seat shell 102. According to an example of construction, the opening 164 of the seat shell 102 and the latch 160 can respectively have polygonal cross-sections that complementarily match with each other so that the engagement of the latch 160 with the opening 164 can rotationally lock the latch 160, the transversal shaft 122 and the two gears 118 with the seat shell 102.

Figure 10:
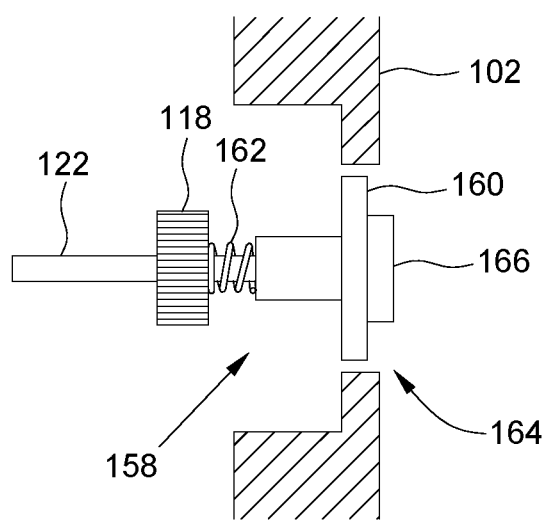
FIG. 10 is a schematic side view illustrating the locking mechanism shown in FIG. 9.

Referring to FIG. 10, the spring 162 can have two ends respectively connected with the latch 160 and the transversal shaft 122 and/or one gear 118. The spring 162 can bias the latch 160 toward the locking position.

For adjusting the two extension parts 112A and 112B, the latch 160 can be urged to slide inward relative to the transversal shaft 122 so as to disengage from the opening 164 of the seat shell 102. An actuation part 166 fixedly connected with the latch 160 may be exposed on a side of the seat shell 102 for facilitating unlocking the two extension parts 112A and 112B. The actuation part 166 may be depressed, which can urge the latch 160 to slide to the unlocking position and disengage from the opening 164 of the seat shell 102. Once the latch 160 is in the unlocking position, the latch 160, the transversal shaft 122 and the two gears 118 can rotate in unison as the two extension parts 112A and 112B are movably adjusted relative to the seat shell 102. For example, a caregiver can rotate the actuation part 166 in the depressed state, which causes the latch 160, the transversal shaft 122 and the two gears 118 to rotate in unison, which results in the two extension parts 112A and 112B sliding relative to the seat shell 102 to a desired position. Once the two extension parts 112A and 112B are in the desired position, the actuation part 166 can be released, and the spring 162 can bias the latch 160 to engage with the opening 164 of the seat shell 102 for locking the two extension parts 112A and 112B.

Figure 13:
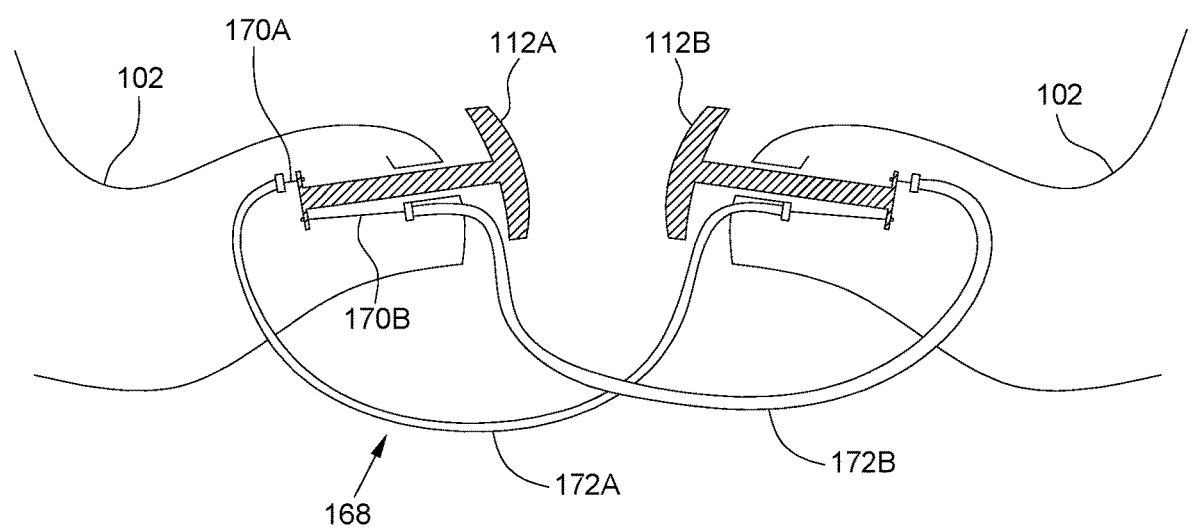
FIG. 13 is a schematic view illustrating another linking assembly using cables for slidably coupling the two extension parts of the child safety seat.

FIG. 13 is a schematic view schematically illustrating another linking assembly 168 that may substitute for the linking assembly 114 described previously to slidably couple the two extension parts 112A and 112B. Referring to FIG. 13, the linking assembly 168 can include two cables 170A and 170B, one of the two cables 170A and 170B being configured to slidably couple the two extension parts 112A and 112B in a deploying direction, and the other one of the two cables 170A and 170B being configured to slidably couple the two extension parts 112A and 112B in a retracting direction. For example, the cable 170A can be routed through a sheath 172A fixedly connected with the seat shell 102 (e.g., at two opposite ends of the sheath 172A), and can have two opposite ends respectively connected with the two extension parts 112A and 112B. The cable 170A is configured to transfer a driving force in a deploying direction exerted by the extension part 112A acting as a master extension part to the extension part 112B acting as a slave extension part. Through the cable 170A, a sliding movement of the extension part 112A for protruding forward from the seat shell 102 can drive the other extension part 112B to slide concurrently for protruding forward from the seat shell 102.

Likewise, the cable 170B can be routed through a sheath 172B fixedly connected with the seat shell 102 (e.g., at two opposite ends of the sheath 172B), and can have two opposite ends respectively connected with the two extension parts 112A and 112B. The cable 170B is configured to transfer a driving force in a retracting direction exerted by the extension part 112A acting as a master extension part to the extension part 112B acting as a slave extension part. Through the cable 170B, a sliding movement of the extension part 112A for retracting toward an interior of the seat shell 102 can cause the other extension part 112B to slide concurrently for retracting toward the interior the seat shell 102.

Figure 14:
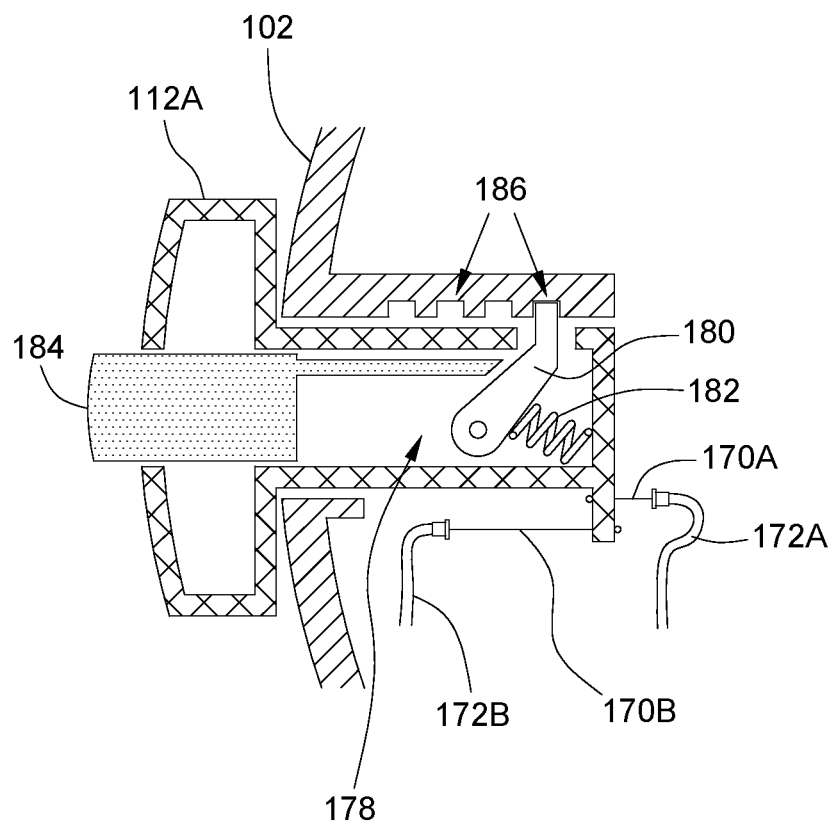
FIG. 14 is a cross-sectional view illustrating an exemplary locking mechanism for locking the two extension parts coupled to each other via the linking assembly shown in FIG. 13.

In conjunction with FIG. 13, FIG. 14 is a cross-sectional view illustrating an exemplary locking mechanism 178 for locking the two extension parts 112A and 112B in position. Referring to FIGS. 13 and 14, the locking mechanism 178 can include a latch 180, a spring 182 and an actuation part 184, all of which can be carried on one of the two extension parts 112A and 112B, e.g., the extension part 112A. The latch 180 can be movably connected with the extension part 112A, e.g., the latch 180 can be pivotally connected with the extension part 112A. Accordingly, the latch 180 can move relative to the extension part 112A to engage with and disengage from the seat shell 102 for adjustment of the two extension parts 112A and 112B. A row of locking openings 186 may be provided in the seat shell 102 for locking engagement of the latch 180, each of the locking openings 186 being associated with a different adjustment position of the two extension parts 112A and 112B.

The spring 182 can have two opposite ends respectively connected with the latch 180 and the extension part 112A. The spring 182 can bias the latch 180 toward a locking position engaged with any one of the locking openings 186.

The actuation part 184 can be slidably assembled with the extension part 112A, and can be exposed at a front of the extension part 112A for operation. The actuation part 184 can be depressed to urge the latch 180 to move relative to the extension part 112A against the biasing action of the spring 182 and disengage from any one of the locking openings 186 for unlocking the extension part 112A.

Since the two extension parts 112A and 112B are slidably coupled to each other, the same locking mechanism 178 described previously may be provided on only one or both of the two extension parts 112A and 112B as desired.

Figure 15:
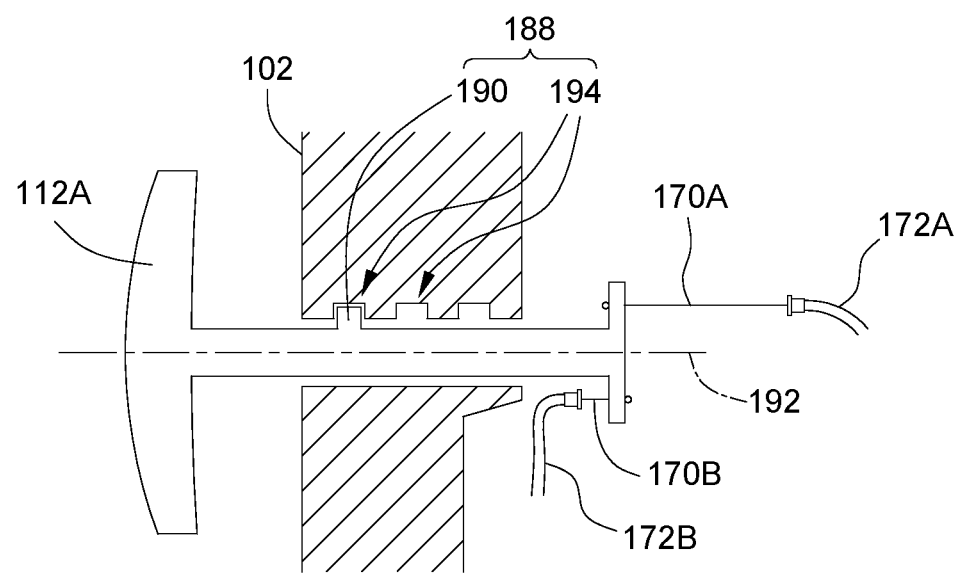
FIG. 15 is a cross-sectional view illustrating another construction of a locking mechanism for locking the two extension parts coupled to each other via the linking assembly shown in FIG. 13.
Figure 16:
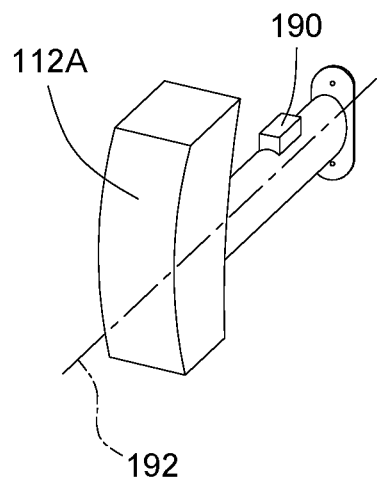
FIG. 16 is a perspective view illustrating a latch of the locking mechanism shown in FIG. 15 provided on one extension part of the child safety seat.
Figure 17:
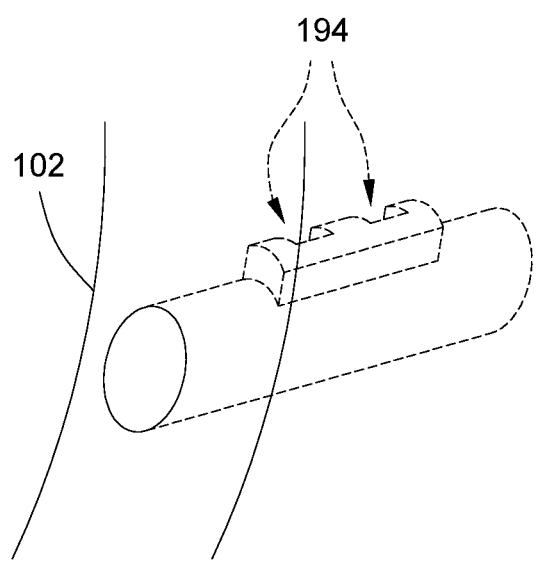
FIG. 17 is a schematic perspective view illustrating locking openings provided inside a seat shell of the child safety seat for locking engagement of the latch shown in FIG. 16.

In conjunction with FIG. 13, FIGS. 15-17 are schematic views illustrating another locking mechanism 188 that can substitute for the locking mechanism 178 described previously to lock the two extension parts 112A and 112B. Referring to FIGS. 15-17, the locking mechanism 188 can include a latch 190 fixedly connected with one of the two extension parts 112A and 112B, e.g., the extension part 112A. Moreover, the connection of the extension part 112A with the seat shell 102 allows rotation of the extension part 112A relative to the seat shell 102 in addition to sliding movements of the extension part 112A. In other words, the extension part 112A can slide along an axis 192 for protruding at the front of the seat shell 102 or retracting toward the interior of the seat shell 102, and can further rotate about the axis 192 relative to seat shell 102. Accordingly, the latch 190 and the extension part 112A can move in unison, and the extension part 112A is rotatable about the axis 192 to engage the latch 190 with the seat shell 102 or disengage the latch 190 from the seat shell 102. For example, the seat shell 102 can include a row of locking openings 194 associated with different adjustment positions of the extension part 112A. The extension part 112A can rotate about the axis 192 in a first direction to engage the latch 190 with any one of the locking openings 194 for locking the extension part 112A in position, and in an opposite second direction to disengage the latch 190 from the locking openings 194 for unlocking the extension part 112A. For adjusting the axial position of the extension part 112A, a caregiver can first rotate the extension part 112A about the axis 192 so that the latch 190 disengages from the locking openings 194, which unlocks the extension part 112A and allows its sliding along the axis 192 relative to the seat shell 102. Once the extension part 112A reaches a desired position, the extension part 112A can be rotated reversely so that the latch 190 can engage with another one of the locking openings 194, which locks the extension part 112A in position.

Since the two extension parts 112A and 112B are slidably coupled to each other, the same locking mechanism 188 described previously may be provided on only one or both of the two extension parts 112A and 112B as desired.

Advantages of the structures described herein include the ability to adjust a front leg room of a child safety seat with two extension parts disposed at a left and a right side of a seat shell, whereby the child safety seat can accommodate children of different ages in a rear facing configuration. Moreover, the two extension parts are transversally disconnected and separated from each other at a front of the seat shell, so that a child can sit comfortably with the legs folded and placed in a clearance between the two extension parts and in front of the seat shell.

Realizations of the child safety seats have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat shell having a seat region for receiving a child;
   two extension parts respectively disposed at a left and a right side of the seat region and connected with the seat shell, the two extension parts being coupled to each other via a linking assembly, the two extension parts being movable together relative to the seat shell to protrude forward from a front of the seat shell or retract toward the seat shell, the two extension parts being disconnected from each other at the front of the seat shell; and
   a locking mechanism operable to lock the two extension parts in position relative to the seat shell;
   wherein the linking assembly includes two gears rotationally coupled to each other that are pivotally connected with the seat shell, and the two extension parts respectively have two toothed portions inside the seat shell, the two gears respectively meshing with the two toothed portions of the two extension parts.

2. The child safety seat according to claim 1, wherein the two extension parts are slidable relative to the seat shell to protrude forward from the front of the seat shell or retract toward the seat shell.

3. The child safety seat according to claim 1, wherein the two gears are fixedly connected with a transversal shaft, the two gears and the transversal shaft being rotatable in unison relative to the seat shell.

4. The child safety seat according to claim 1, wherein the locking mechanism includes a latch connected with the seat shell and movable to engage with and disengage from the linking assembly, an engagement of the latch with the linking assembly rotationally locking the two gears and thereby preventing movement of the two extension parts relative to the seat shell, and a disengagement of the latch from the linking assembly allowing rotation of the two gears for movement of the two extension parts relative to the seat shell.

5. The child safety seat according to claim 4, wherein the latch is movable to engage with and disengage from one of the two gears.

6. The child safety seat according to claim 5, wherein the latch is pivotally connected with the seat shell, and is connected with an actuation part accessible from the front of the seat shell for operation, the actuation part being operable to cause the latch to rotate and disengage from the gear.

7. The child safety seat according to claim 5, wherein the latch is slidably connected with the seat shell, and is connected with an actuation part accessible from a side of the seat shell for operation, the actuation part being operable to cause the latch to slide and disengage from the gear.

8. The child safety seat according to claim 7, wherein the actuation part is operable to cause the latch to slide along a transversal axis extending from the left to the right side of the seat shell for disengaging from the gear.

9. The child safety seat according to claim 4, wherein the two gears are fixedly connected with a transversal shaft, and the latch is movable to engage with and disengage from the transversal shaft.

10. The child safety seat according to claim 9, wherein the transversal shaft has a toothed portion disposed between the two gears, and the latch engages with the toothed portion to rotationally lock the transversal shaft and the two gears.

11. The child safety seat according to claim 1, wherein the two gears are fixedly connected with a transversal shaft, and the locking mechanism includes a latch connected with the transversal shaft, the latch being slidable axially relative to the transversal shaft and rotationally coupled to the transversal shaft, the latch being movable to engage with and disengage from the seat shell, an engagement of the latch with the seat shell rotationally locking the transversal shaft and the two gears and thereby preventing movement of the two extension parts relative to the seat shell, and a disengagement of the latch from the seat shell allowing the latch, the transversal shaft and the two gears to rotate in unison as the two extension parts move relative to the seat shell.

12. The child safety seat according to claim 11, wherein the seat shell has an opening, and the locking mechanism further includes a spring biasing the latch for engagement with the opening of the seat shell.

13. A child safety seat comprising:

a seat shell having a seat region for receiving a child;

two extension parts respectively disposed at a left and a right side of the seat region and connected with the seat shell, the two extension parts being coupled to each other via a linking assembly, the two extension parts being movable together relative to the seat shell to protrude forward from a front of the seat shell or retract toward the seat shell, the two extension parts being disconnected from each other at the front of the seat shell; and a locking mechanism operable to lock the two extension parts in position relative to the seat shell;

wherein the linking assembly includes two cables, each of the two cables having two opposite ends respectively connected with the two extension parts, one of the two cables being configured to slidably couple the two extension parts in a deploying direction, and the other one of the two cables being configured to slidably couple the two extension parts in a retracting direction.

14. The child safety seat according to claim 13, wherein the locking mechanism includes a latch carried on one of the two extension parts, the latch being movable to engage with and disengage from the seat shell for adjustment of the two extension parts.

15. The child safety seat according to claim 14, wherein the seat shell includes a row of locking openings for engagement of the latch.

16. The child safety seat according to claim 15, wherein the latch is movably connected with the extension part, whereby the latch is movable relative to the extension part to engage with and disengage from the locking openings provided in the seat shell.

17. The child safety seat according to claim 16, wherein the locking mechanism further includes an actuation part operable to urge the latch to move relative to the extension part for disengaging from the seat shell.

18. The child safety seat according to claim 15, wherein the latch is fixedly connected with the extension part, the extension part and the latch fixedly connected therewith being rotatable in unison to engage the latch with any one of the locking openings and to disengage the latch from the locking openings.

* * * * *